(12) United States Patent
Stockhammer et al.

(10) Patent No.: US 10,887,645 B2
(45) Date of Patent: Jan. 5, 2021

(54) PROCESSING MEDIA DATA USING FILE TRACKS FOR WEB CONTENT

(71) Applicant: QUALCOMM Incorporated, San Diego, CA (US)

(72) Inventors: Thomas Stockhammer, Bergen (DE); Yekui Wang, San Diego, CA (US); Giridhar Dhati Mandyam, San Diego, CA (US); Charles Nung Lo, San Diego, CA (US); Waqar Zia, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/033,999

(22) Filed: Jul. 12, 2018

(65) Prior Publication Data

US 2019/0020915 A1 Jan. 17, 2019

Related U.S. Application Data

(60) Provisional application No. 62/532,237, filed on Jul. 13, 2017.

(51) Int. Cl.
*H04N 21/462* (2011.01)
*H04N 21/43* (2011.01)
(Continued)

(52) U.S. Cl.
CPC ....... *H04N 21/4307* (2013.01); *G06F 16/958* (2019.01); *H04L 65/4084* (2013.01);
(Continued)

(58) Field of Classification Search
CPC ................................................ H04N 21/4622
See application file for complete search history.

(56) References Cited

U.S. PATENT DOCUMENTS 10,334,309 B2 * 6/2019 Guo .................... H04N 21/2187
2016/0267879 A1 * 9/2016 Champel ............ H04N 5/44591
(Continued)

FOREIGN PATENT DOCUMENTS

WO 03098475 A1 11/2003
WO 2008115344 A1 9/2008
(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Michael H Hong
(74) *Attorney, Agent, or Firm* — Campbell C. Chiang; Shumaker & Sieffert, P.A.

(57) ABSTRACT

In one example, a device for retrieving media data includes a memory configured to store media data, and one or more processors implemented in circuitry and configured to retrieve a file including the media data, web content formatted according to hypertext markup language (HTML), and data indicating how to synchronize the web content with the media data, and present the media data and the web content, wherein to present the media data and the web content, the one or more processors are configured to synchronize presentation of the web content with presentation of the media data according to the data indicating how to synchronize the web content with the media data.

50 Claims, 9 Drawing Sheets

(51) Int. Cl.
  *H04L 29/06* (2006.01)
  *H04L 29/08* (2006.01)
  *G06F 16/958* (2019.01)
  *H04N 21/854* (2011.01)
  *H04N 21/8547* (2011.01)
(52) U.S. Cl.
  CPC ............ *H04L 65/607* (2013.01); *H04L 67/02* (2013.01); *H04L 67/2804* (2013.01); *H04N 21/8547* (2013.01); *H04N 21/85406* (2013.01); *H04N 21/4622* (2013.01)

(56) References Cited

U.S. PATENT DOCUMENTS

| | | | | |
|---|---|---|---|---|
| 2016/0373498 | A1* | 12/2016 | Mandyam | H04L 65/4015 |
| 2017/0093939 | A1* | 3/2017 | Bar-Mashiah | H04L 65/608 |
| 2018/0213294 | A1* | 7/2018 | Lau | H04N 21/6125 |

FOREIGN PATENT DOCUMENTS

| | | | |
|---|---|---|---|
| WO | 2016182844 | A1 | 11/2016 |
| WO | 2016205768 | A1 | 12/2016 |
| WO | 2017140939 | A1 | 8/2017 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Fielding et al., "Hypertext Transfer Protocol—HTTP/1.1," Network Working Group, RFC 2616, The Internet Society, Jun. 1999, 114 pp.
Paila, et al., "FLUTE—File Delivery over Unidirectional Transport," Internet Engineering Task Force, RFC 6726, Nov. 2012, 46 pp.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 2012, XP002712145, 132 pp.
International Standard ISO/IEC 14496-12, Information Technology—Coding of audio-visual objects—Part 12: ISO base media file format, Third Edition, Oct. 15, 2008, 120 pp.
Cha R., et al., "Improved Combined Inter-intra Prediction Using Spatial-Variant Weighted Coefficient," International Conference on Multimedia and Expo (ICME), Jul. 11, 2011, pp. 1-5, XP031964687.
Chen Y., et al., "A Pre-filtering Approach to Exploit Decoupled Prediction and Transform Block Structures in Video Coding," IEEE International Conference on Image Processing (ICIP), Oct. 27-30, 2014, Oct. 1, 2014, pp. 4137-4140, XP055299349.
Chen Y., et al., "Joint Inter-Intra Prediction based on Mode-variant and Edge-directed Weighting Approaches in Video Coding," IEEE International Conference on Acoustics, Speech and Signal Processing (ICASSP), May 4, 2014, pp. 7372-7376, XP032617571, [retrieved on Jul. 11, 2014].
Debargha M., et al., "An Overview of New Video Coding Tools Under Consideration for VP10: the Successor to VP9," Visual Communications and Image Processing, vol. 9599, Sep. 22, 2015, pp. 95991E-1 to 95991E-12, XP060060839.
Kim I-K., et al., "Coding Efficiency Comparison of New Video Coding Standards: HEVC vs VP9 vs AVS2 Video," IEEE International Conference on Multimedia and Expo (ICME), Jul. 14, 2014, pp. 1-6, XP032639340, [retrieved on Sep. 3, 2014].
Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, no. JCTVC-K0036, Oct. 2, 2012 (Oct. 2, 2012), XP030112968, pp. 1-21.
International Search Report and Written Opinion—PCT/US2018/039051—ISA/EPO—dated Sep. 18, 2018, 15 pp.
International Search Report and Written Opinion—PCT/US2018/042060—ISA/EPO—dated Oct. 12, 2018—14 pp.
Berners-Lee T., et al., "Uniform Resource Identifier (URI): Generic Syntax", Network Working Group; Request for Comments: 3986 STD: 66 Updates 1738 Obsoletes: 2732, 2396, 1808 Category: Standards Track; W3C/MIT R Fielding Day Sotware L Masinter Adobe Systems, Jan. 2005, 61 pages.
Concolato C., "Carriage of Timed Subtitles and Graphics in MP4", Jul. 19, 2012, pp. 1-7, XP055574236, Retrieved from the Internet: URL: https://www.slideshare.net/cconcolato/carriage-of-timed-subtitles-and-graphics-in-mp4 [retrieved on Mar. 26, 2019]p. 2, paragraph 2—p. 3, paragraph 13.
"Information technology—Coding of audio-visual objects—Part 15: Carriage of network abstraction layer (NAL) unit structured video in the ISO base media file format," International Standard Organization, ISO/IEC FDIS 14496-15-2014; Jan. 13, 2014, 179 pp.
"ISO/IEC 14496-30 Timed Text and other visual overlays in ISO Base Media File Format", Oct. 2012, 17 pages.
ISO/IEC 23008-12: 2017 "Information technology—High Efficiency Coding and Media Delivery in Heterogeneous Environments—Part 12: Image File Format", Dec. 2017, 82 pages.
Pfeiffer S., et al., "Sourcing In-band Media Resource Tracks from Media Containers into HTML", Apr. 26, 2015, 21 pages.
Wikipedia: "Dynamic HTML", retrieved from Internet on Jul. 31, 2019, 4 pages.

\* cited by examiner

PROCESSING MEDIA DATA USING FILE TRACKS FOR WEB CONTENT

This application claims the benefit of U.S. Provisional Application No. 62/532,237, filed Jul. 13, 2017, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for processing media data included in a file format having one or more tracks carrying presentation-synchronized web content. That is, the web content is to be presented in a time-synchronized manner with the media data. For example, interactive web content elements may be presented at certain times overlaid with video data. A file may include media data, web content, and data representing synchronization between the web content and the media data. In this manner, a client device can retrieve only a single file and yet time-synchronize presentation of the media data and the web content using only the contents of the retrieved file.

In one example, a method of retrieving media data includes retrieving a file including media data, web content formatted according to hypertext markup language (HTML), and data indicating how to synchronize the web content with the media data, and presenting the media data and the web content, wherein presenting the media data and the web content comprises synchronizing presentation of the web content with presentation of the media data according to the data indicating how to synchronize the web content with the media data.

In another example, a device for retrieving media data includes a memory configured to store media data, and one or more processors implemented in circuitry and configured to retrieve a file including the media data, web content formatted according to hypertext markup language (HTML), and data indicating how to synchronize the web content with the media data, and present the media data and the web content, wherein to present the media data and the web content, the one or more processors are configured to synchronize presentation of the web content with presentation of the media data according to the data indicating how to synchronize the web content with the media data.

In another example, a device for retrieving media data includes means for retrieving a file including media data, web content formatted according to hypertext markup language (HTML), and data indicating how to synchronize the web content with the media data, and presenting the media data and the web content, wherein the means for presenting the media data and the web content comprises means for synchronizing presentation of the web content with presentation of the media data according to the data indicating how to synchronize the web content with the media data.

In another example, a computer-readable storage medium has stored thereon instructions that, when executed, cause a processor to retrieve a file including media data, web content formatted according to hypertext markup language (HTML), and data indicating how to synchronize the web content with the media data, and present the media data and the web content, wherein the instructions that cause the processor to present the media data and the web content comprise instructions that cause the processor to synchronize presentation of the web content with presentation of the media data according to the data indicating how to synchronize the web content with the media data.

The details of one or more examples are set forth in the accompanying drawings and the description below. Other features, objects, and advantages will be apparent from the description and drawings, and from the claims.

DETAILED DESCRIPTION

Figure 1:
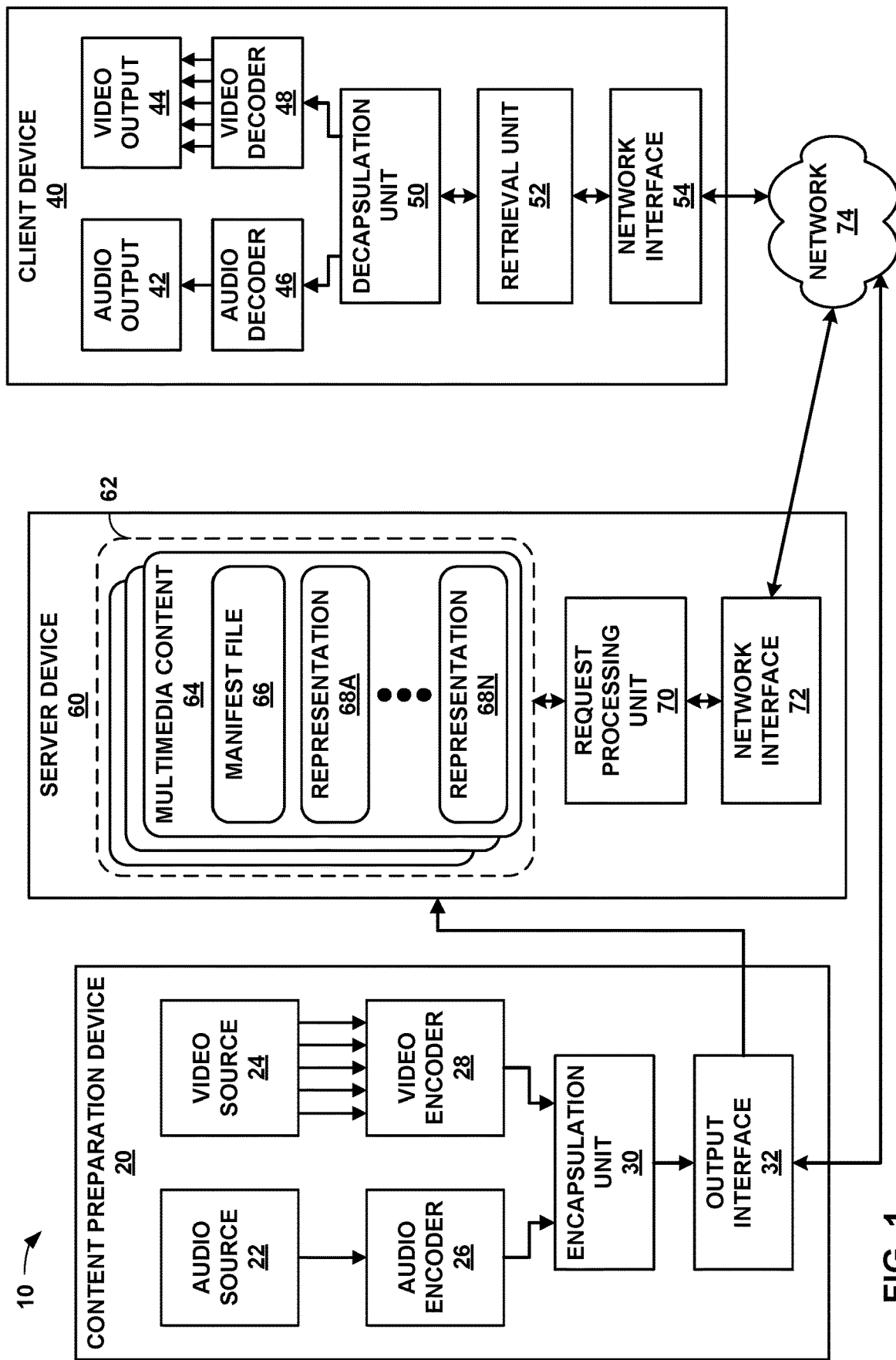
FIG. 1 is a block diagram illustrating an example system that implements techniques for streaming media data over a network.

In general, the techniques of this disclosure are directed to using media files including both media data and time-synchronized web content. For example, the web content may be presented in a time-synchronized fashion with the media data (e.g., audio data and/or video data). For example, certain web content may be presented at the same time as a certain audio sample of the audio data is played or when a particular image or image sequence of the video data is displayed. This disclosure describes techniques by which a client device can process such a media file and present both the media data and the web content in a time-synchronized fashion.

For example, a client device may include a web socket server, an HTTP server cache, and an HTML-5 processor. The HTML-5 processor may be communicatively coupled to the web socket server via a Web Socket API (application programming interface) and to the HTTP server cache via an XML HTTP Request (XHR) connection. As another example, a client device may include an interpreter for interpreting web content track data and decode/display times from media decoders and coordinate presentation of web content accordingly.

The techniques of this disclosure may be applied to video files conforming to video data encapsulated according to any of ISO base media file format (BMFF), Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, such as Dynamic Adaptive Streaming over HTTP (DASH), frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

The techniques of this disclosure may be applied in various use cases. For example, this disclosure recognizes that it should be possible to package audio/video content and web data so that interactive playback from a regular web browser can be achieved without specific modifications to the HTML logic (e.g., without specific code for file loading, track handling, etc.) In particular, access to an interactive application packaged in MP4 should be transparent to the browser.

One typical use case when consuming an audio/video file is to seek to a particular position in the file's timeline. Since not all video/audio frames may be individually decodable, file formats typically identify random access points, such as intra-predicted video frames. If a file contains additional data for web page changes or updates (layout, content, etc.), seeking to a given time in the file should also produce the correct page rendering, possibly with random access points into the page changes.

Generally, different types of clients (fully browser-based, dedicated media clients with partial web engine functionality, etc.) and services (primarily A/V with overlay, web-based media consumption) exist, and it may be desirable to provide a service to different types of clients. It may also be that some clients only support a basic functionality, whereas others support advanced functionality.

A main requirement for a service provider is the ability to send media time synchronized graphics, overlay, interactive data, any type of web data, and so on, while not defining the application environment for itself. A redo of LASER, DIMS, or FLASH is not considered.

On a file format track level, important aspects may include carriage of web data and their synchronization, and syntax and semantics of the data for interoperable implementation.

Various existing technologies are considered relevant to the techniques of this disclosure. DASH events, for example, represent one option for carrying synchronized data. Such DASH events may either be in-band or form part of a media presentation description (MPD) event stream. Common implementations that are supported in browsers may require application intervention. For instance, MPD-carried event streams may require that the application handles these events after the application or DASH client parses these events from the MPD. The 'emsg' method of carriage may be problematic, in that many media player implementations ignore this box altogether (as opposed to passing the data to the application for handling). In addition, DASH events are typically parsed and processed by the DASH client, and hence, DASH events typically cannot be properly stored in ISO Base Media File Format (BMFF) files. Also, DASH events typically provide carriage only, but do not describe the processing model of the payload.

HTML-5 is another example technology. There are at least two options to provide interactivity and dynamicity in HTML pages, in particular, when video and audio resources are also used. Page changes may be provided as part of the main HTML resource (e.g. as part of embedded JavaScript), in which case the synchronization to audio/video is handled specifically by the JavaScript. Alternatively, page changes may be provided as part of additional timed resources, which are synchronized directly by the browser. A first approach includes progressive parsers, in which case the delivery can schedule the execution of events, but only coarsely synced to media.

A second approach includes TextTrack elements, in which case content in the text track can be displayed synchronously and natively by the browser. Text tracks with hidden mode are processed by the browser (i.e., the content of the track is exposed to JavaScript, events are triggered, if used) but its content is not rendered directly on screen by the browser. The content is processed by JavaScript event handlers. TextTracks of kind "metadata" are general-purpose tracks that are used to provide any kind of data to the Web application. Metadata tracks are not meant to provide ready-to-be-displayed data because browsers treat such track as "hidden." Metadata track content is meant to be processed by JavaScript code in the page, and the result may be displayed in the page. HTML-5 defines a basic mapping of some types of ISOBMFF tracks to the TextTrack concept, in particular, to tracks of role "metadata." This work is being refined by the W3C Media Resources In-Band Tracks Community Group, as described at www.w3.org/community/inbandtracks/.

File format technologies are also considered relevant. ISO/IEC 14496-12 defines the storage of timed data using tracks, e.g., for ISOBMFF. ISOBMFF in ISO/IEC 14496-12 defines several types of tracks, using first a 4-character code called "track handler" and then a second 4-character code called the "sample description format." The track handler identifies the expected general processing associated with the track (e.g., audio processing vs. text processing vs. video processing . . . ). The sample description format identifies the specific format of the media samples in the track. 'Meta' indicates that the associated decoder will process data that is not meant to be displayed directly but processed by the application, possibly for display.

The ISOBMFF 'meta' track handler indicates that the track content is not meant for direct display. It can also be used in the content of the HTML 5 TextTrack API. There are several sample description formats available for a track of handler 'meta.' The URIMetadataSampleEntry (identified by the sample description format 'urim') is used when the data is binary, according to ISOBMFF. A URI identifies the format of each sample and some initialization information can be provided.

The URIMetadataSampleEntry can be used for web interactivity if the input data is binary data, not text-based. A specification using this format would have to define a URI value, and the associated binary sample format and initialization format. It would have to indicate also which samples are sync samples. In an HTML-5 environment, when consumed via the TextTrack interface, such track would typically be mapped to a TextTrack with DataCues. The HTML page and in particular the JavaScript needed to process the binary cues are delivered out-of-track, possibly using the simple text track approach or as an item in a 'meta' box.

ISOBMFF defines the "meta" box, which allows for storing untimed data in box-structured files, possibly together with an audio and video sequence. Hence, when the interactivity data is not timed or does not need to be stored as timed chunks of data, interactive data can be stored in items. Such items can be stored by giving them an optional name and a MIME type.

For web data, it is possible to store an HTML page and associated resources, such as CSS and JS, using different items, with the HTML page being the primary item, and with audio/video resources as regular tracks. "Meta"-unaware players would simply play this file as if it were a simple audio/video file, while "meta"-aware player would start by loading the HTML and associated resources, and then loading the audio/video in the context of this page.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
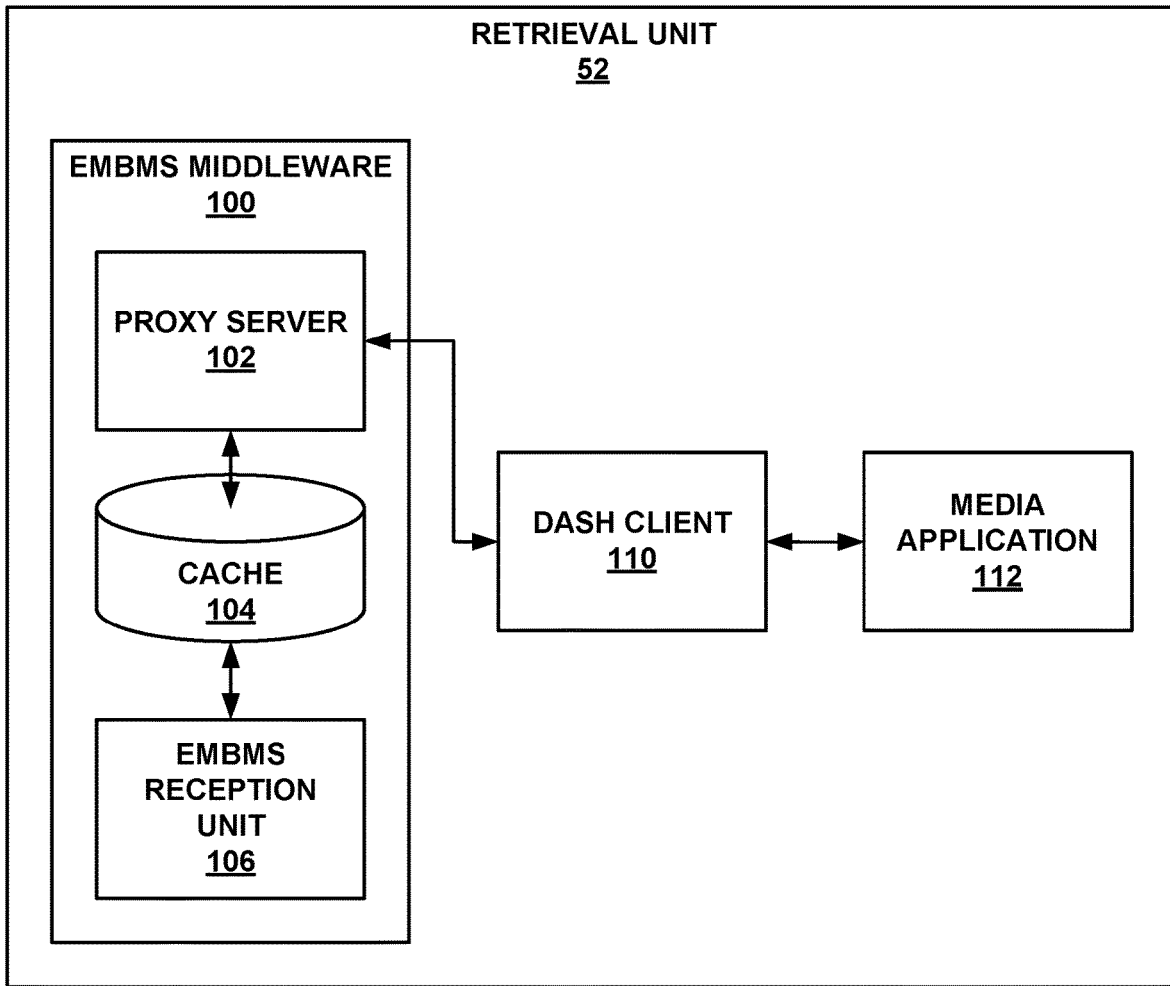
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 3:
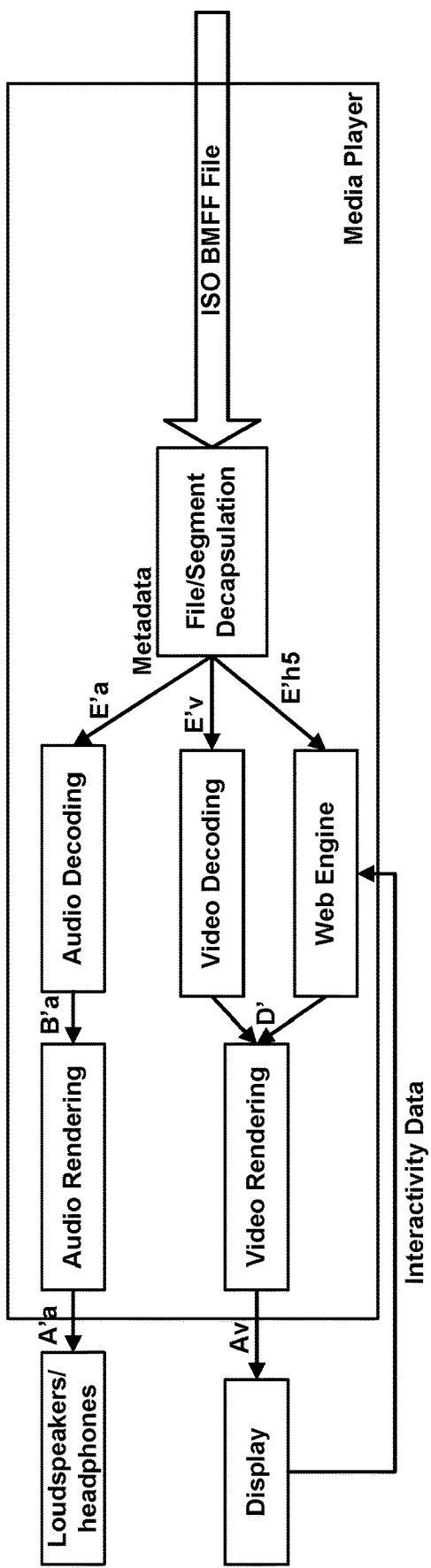
FIG. 3 is a conceptual diagram illustrating an example web interactivity track according to the techniques of this disclosure.

FIG. 3 is a conceptual diagram illustrating an example web interactivity track according to the techniques of this disclosure. In many cases, web page interactivity needs to be provided not only in a browser, but also in stand-alone applications. This disclosure recognizes an expected benefit to providing an interoperable solution on the ISO BMFF track level. Components of FIG. 3 may generally correspond to similarly-named components of client device 40 of FIG. 1.

A possible solution may be provided by enabling the carriage of HTML-5 data, as well as JavaScript and other dynamic web data, in a consistent manner in file format information according to ISO BMFF. This consistency would support different use cases and provide broader interoperability. The basic idea is shown in FIG. 3. A track may be encapsulated in file format information and terminate in a Web Engine. Events may be provided to the web engine in order to enable synchronization of the events to the media.

The track may contain an HTML-5 entry page (something like RAP/sync sample) and possibly dynamic events that are synchronized. FIG. 3 illustrates one example implementation to handle this. In another example, ISO BMFF may terminate in the browser. A JavaScript-based parser may extract the HTML-5 data and provide the dynamics, whereas the video and audio track may be handled using the video and audio tag. Usage with DASH and CMAF may rely on providing a fragmented/segmented version of the Web Interactivity track.

The track may be limited to HTML-5 and JS data, and the model may be that at a certain media time, either the HTML-5 page is rendered or the results of the JavaScript code are executed. Each event is assigned a presentation time, and the time is associated to when the document object model (DOM) modifications are active. It also means that the HTML-5 environment does not have to be launched, but a client device may present video and audio only, if the client device does not support the Web Interactivity. A standalone player may be configured with a Web Engine in order to process the Web Interactivity content. A limited set of features and application programming interfaces (APIs) may be sufficient to present the Web Interactivity content.

Certain issues may be considered when implementing these techniques:
1) There may be a binding between the Web page and the video. That is, there may be an HTML-5 video and (audio) tag in the web page and data linking the video/audio tag to the video track. This linking may be done by track references. For example, data such as "<video src="trackid:// <trackid>">" may be provided.
2) A media source extension (MSE) buffer may be added, e.g., in case a client device works fragment by fragment. The MSE buffer may be up to the application, but the binding may work such that ISO BMFF fragments from a file can be appended to the MSE buffer.
3) In some examples, there may be multiple HTML-5 tracks. In such examples, various HTML-5 tracks may be dedicated to different functionalities. In such examples, types may be described for each of the HTML-5 tracks as well.
4) The web engine may provide various functionalities and capabilities to use the HTML-5 tracks. HTML-5 tracks may use different APIs and functions, and there may be data for signaling required web engine capabilities to render the interactivity track.
5) Typical ISO BMFF functions, such as sync samples, random access points, and the like, may additionally be defined.
6) The above example is restricted to visual aspects, but similar techniques may be performed to allow interactivity with audio elements based on HTML-5 control APIs.
7) The environment may also be defined further. Two example models include playing in a browser, and playing in an application that includes web tools. There are practical and coordination limits (e.g., MSE insists that presentations with unrecognized tracks be ignored).
8) Resources used by Javascript may also be defined, and a normative way for referencing these resources may also be defined. Webarchive blobs may be used for these definitions.

Figure 4:
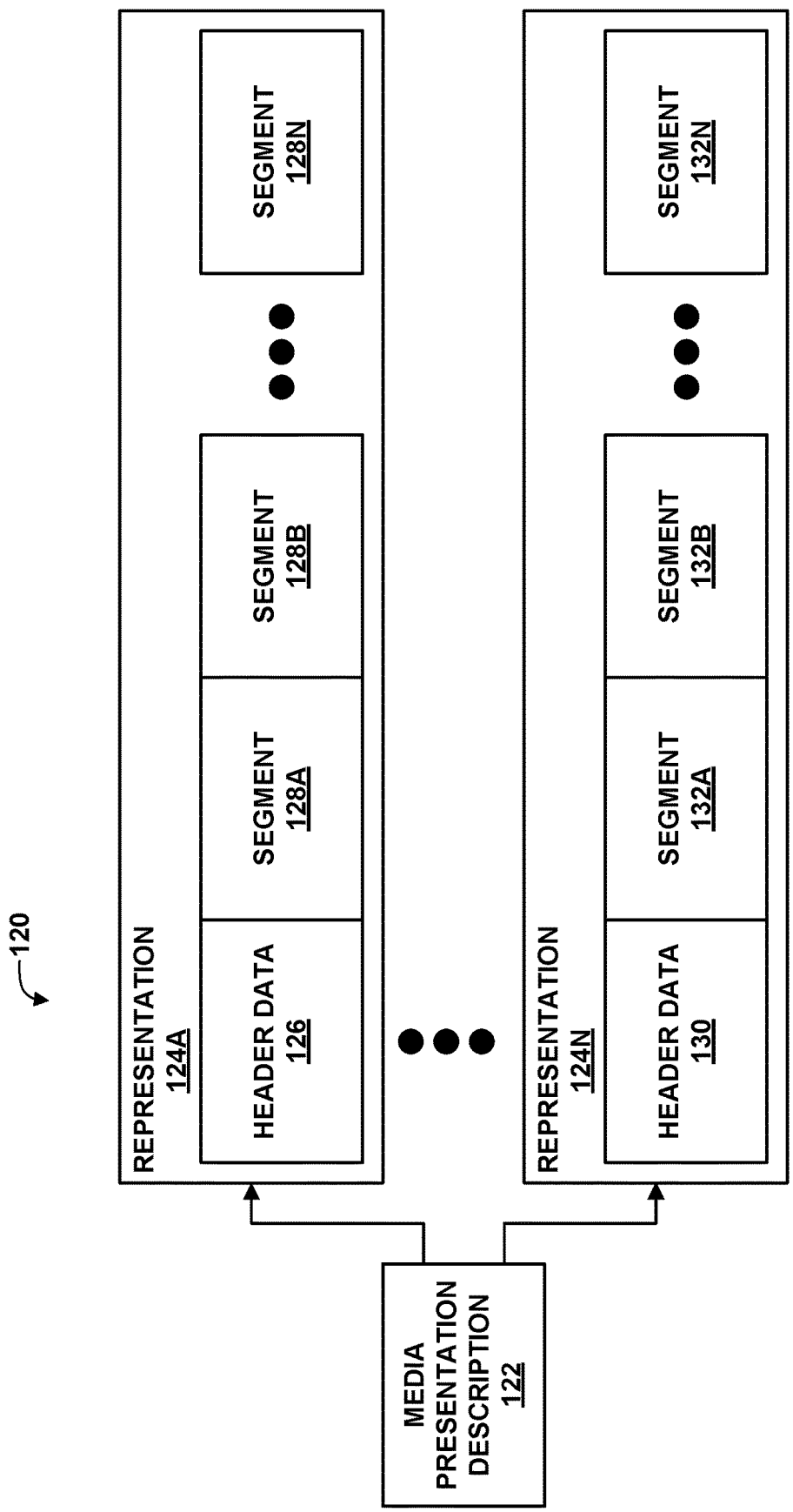
FIG. 4 is a conceptual diagram illustrating elements of example multimedia content.

FIG. 4 is a conceptual diagram illustrating elements of example multimedia content 120. Multimedia content 120 may correspond to multimedia content 64 (FIG. 1), or another multimedia content stored in storage medium 62. In the example of FIG. 4, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 4. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 5:
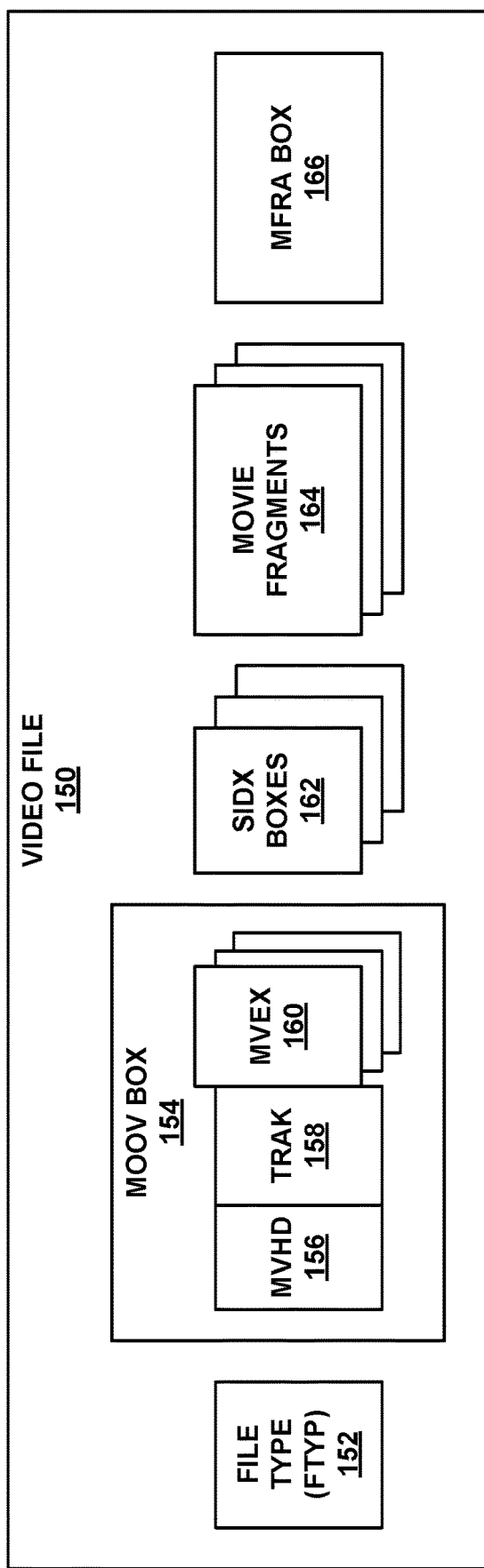
FIG. 5 is a block diagram illustrating elements of an example video file.

FIG. 5 is a block diagram illustrating elements of an example video file 150, which may correspond to a segment of a representation, such as one of segments 114, 124 of FIG. 4. Each of segments 128, 132 may include data that conforms substantially to the arrangement of data illustrated in the example of FIG. 5. Video file 150 may be said to encapsulate a segment. As described above, video files in accordance with the ISO base media file format and extensions thereof store data in a series of objects, referred to as "boxes." In the example of FIG. 5, video file 150 includes file type (FTYP) box 152, movie (MOOV) box 154, segment index (sidx) boxes 162, movie fragment (MOOF) boxes 164, and movie fragment random access (MFRA) box 166. Although FIG. 5 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
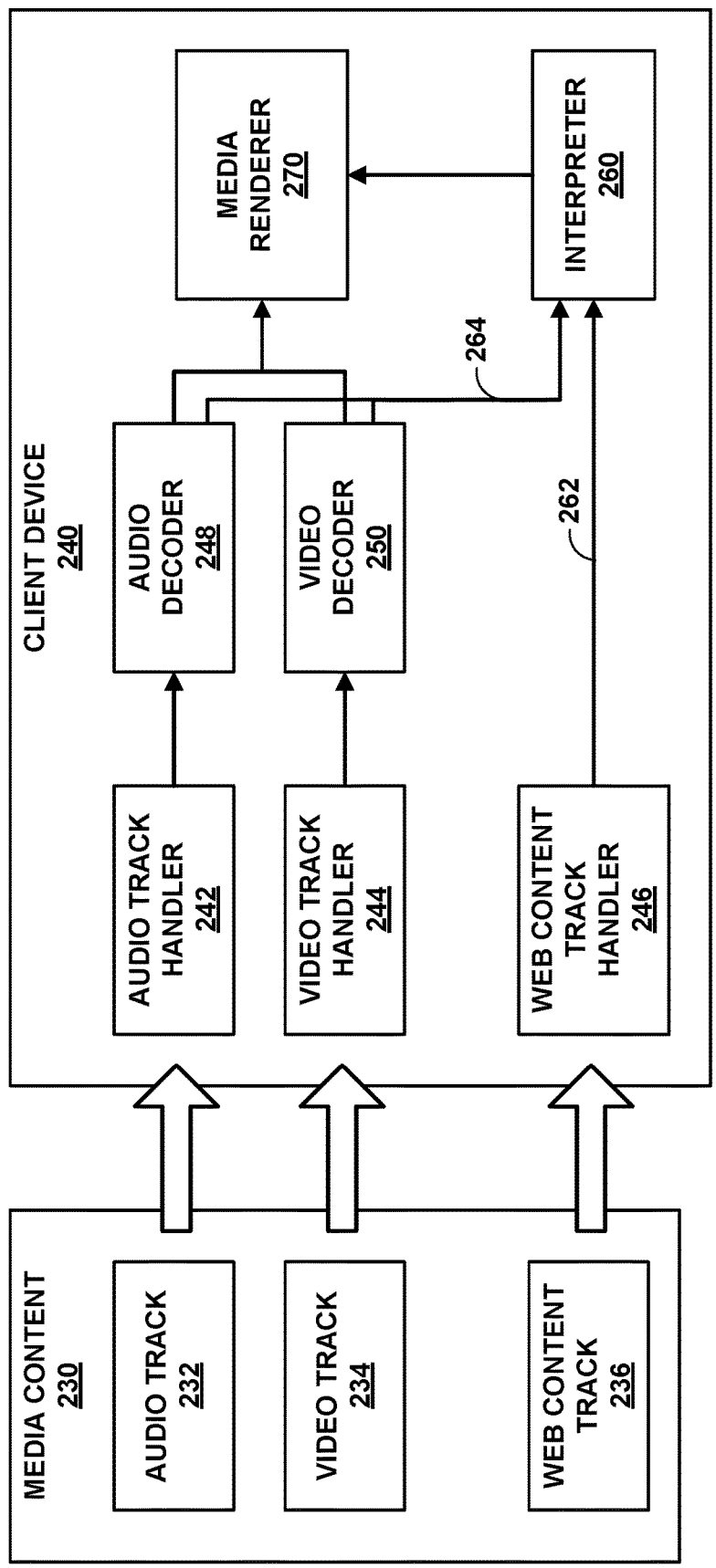
FIG. 7 is a conceptual diagram illustrating an example processing model according to the techniques of this disclosure.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 4) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 5). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 6:
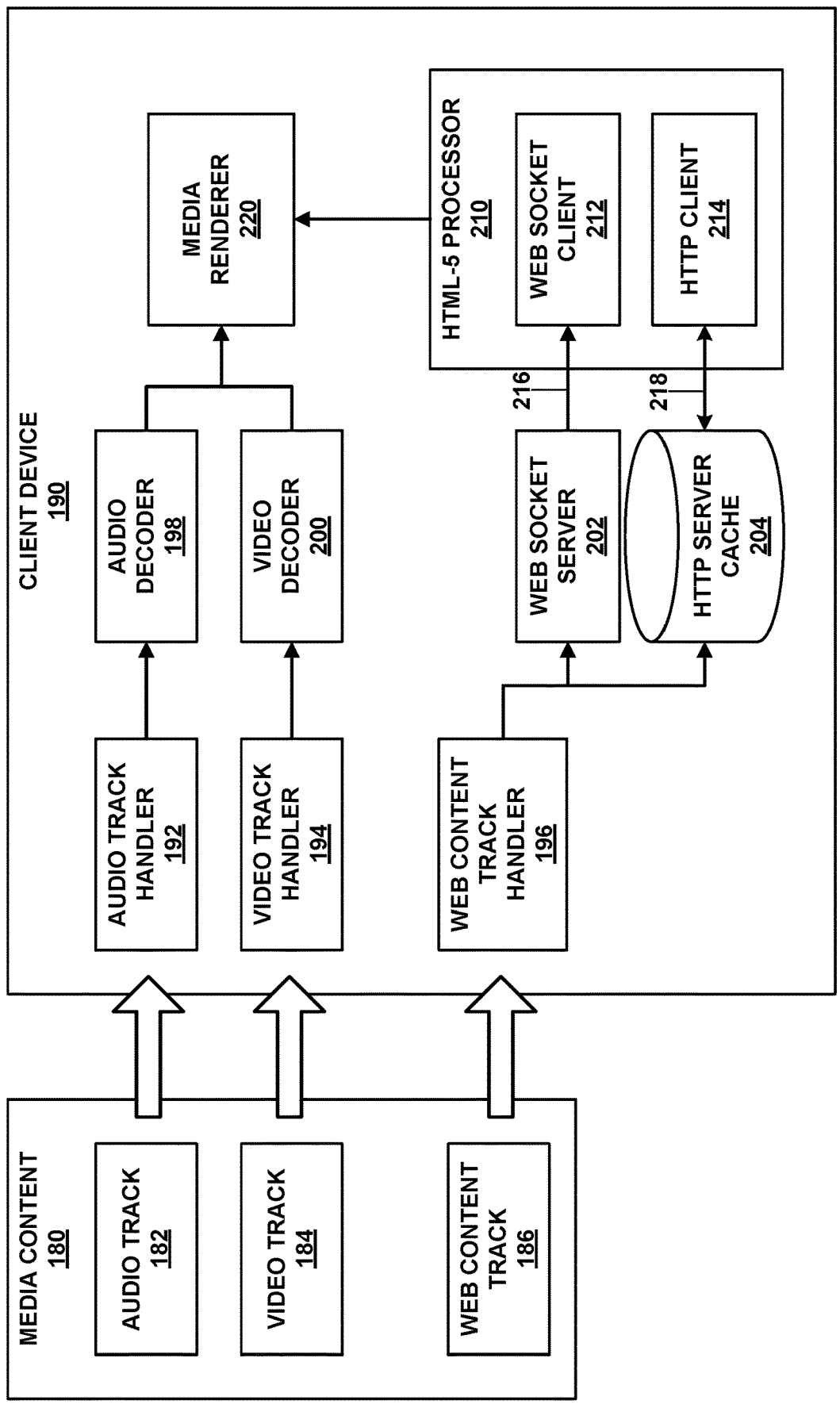
FIG. 6 is a conceptual diagram illustrating an example receiver data processing model according to the techniques of this disclosure.

FIG. 6 is a conceptual diagram illustrating an example receiver data processing model according to the techniques of this disclosure. In particular, FIG. 6 illustrates an example data processing model for media content 180, which may represent, for example, an ISOBMFF file, a CMAF presentation, or a DASH Media Presentation. In this example, media content 180 includes a plurality of tracks, including audio track 182, video track 184, and web content track 186. Collectively, audio track 182 and video track 184 may be referred to as audio/video (AV) tracks. Web content track 186 may correspond to a web/html-5 track including web content that is time-synchronized with audio and/or video data of audio track 182 and video track 184. Furthermore, web content track 186 may include data representing synchronization information with the AV tracks. This model may be used to address and provide a web track according to the techniques of this disclosure.

Client device 40 of FIG. 1 may be configured according to the example model of client device 190 of FIG. 6, and/or other similar client devices may be configured according to this model. In particular, in this example, client device 190 includes audio track handler 192, video track handler 194, web content track handler 196, audio decoder 198, video decoder 200, web socket server 202, HTTP server cache 204, HTML-5 processor 210, and media renderer 220. HTML-5 processor 210 includes web socket client 212 and HTTP client 214. Web socket server 202 and web socket client 212 are communicatively coupled via Web Socket API connection 216, while HTTP server cache 204 and HTTP client 214 are communicatively coupled via XML HTTP Request (XHR) connection 218.

Assume that audio track 182, video track 184, and web content track 186 (e.g., an HTML-5 (htm5) track) are provided in media content 180, such as an ISO BMFF file, a CMAF presentation, or a DASH Media Presentation. This means that the tracks are time-aligned and may be presented in a "synchronized manner" using the decode times, as well as composition and presentation time information in the "Presentation." For all tracks, the information in the movie header and the track headers may be used to initialize the appropriate track handlers (e.g., audio track handler 192, video track handler 194, and web content track handler 196) and media decoders and processors (e.g., audio decoder 198, video decoder 200, web socket server 202, and HTML-5 processor 210). For audio and video, the regular processes may be applied. By initiating the decoder (e.g., audio decoder 198 and video decoder 200), a "socket" may be enabled that enables provision of a sample at the announced decode time to the decoder.

The decoder may use the scheduling of the decode time to decode a corresponding media sample (e.g., audio sample or video sample). The information on presentation and composition times can be used for accurate presentation of the media. The presentation may describe all times in media times and the playback and mapping to real-time may be performed by elements in the presentation environment. The processing model may be guided by the media time that is included in the ISO BMFF.

Audio track 182 and video track 184 may be used stand-alone as a regular AV presentation, ignoring web content track 186. However, capable devices may use web content track 186 (e.g., an htm5 track) as well. As discussed above, different player and service models may be considered, i.e., the AV presentation may be launched and htm5 track added later, or web content track 186 may be used at launch and may integrate the AV tracks. The description in the ISO BMFF is independent of this, but for simplicity, it is assumed now that web content track 186 (e.g., an HTML-5 presentation) is the master track, is launched first, and provides an association to all included AV tracks by using video and audio elements in the HTML-5. Web content track 186 may include data identifying the track as an htm5 track including a sample entry. Furthermore, data may be provided that acts as a binding of the AV tracks to audio and video elements in HTML-5. There may be additional track bindings for multiple audio and video sources as well as other media elements, such as subtitles, etc.

Three example data types may be of interest for web content track 186:

1) An initial launch of an HTML-5 page, potentially including dynamic aspects such as JavaScript and so on. This information may be static (non-timed item) or may be considered a sample at presentation time 0. The video and audio presentation may, for example, be started in a media time delta fashion later than HTML-5 page. This may require adjustment of the presentation of audio and video through an edit list.
2) Any data that is "pushed" at a specific media time into the HTML-5 processor based on the content authors schedule. This may, for example, trigger changes in the DOM synchronized with the playback of the media.

Such data pushed at a specific media time may be considered as a "sample" with the "specific media time" being the decode time.

3) Data that is available for processing in the HTML-5 processor, but may be "requested" by the processor only based on dynamic DOM updates or by interactivity. Such data may typically only be requested within a specific media time period (or multiple periods) in the presentation. Outside these media time periods, such data may be considered irrelevant.

In order for HTML-5 processor 210 to retrieve such data, different types of HTML-5 processes and APIs may be considered. The launch page of point 1 above may include data to launch HTML-5 processor 210. Such information may be available in the track header of web content track 186 as non-timed items or as an initial random access sample. Data following the model of point 2 above may be easily pushed by using Web Socket API connection 216. HTML-5 processor 210 may act as a WebSocket Client, e.g., web socket client 212, and the client side API may be as simple

```
var exampleSocket = new WebSocket
("ws://ExampleLocalWebSocketServer");
exampleSocket.onmessage = function (event)
{
  /* handle event ...*/;
}
```

Web content track handler 196 may emulate a web socket server, e.g., web socket server 202, that is accessible through a dedicated web socket address, e.g., "ws://ExampleLocalWebSocketServer" socket. Using, e.g., a "send" method, the function above may be called to handle it on the client side. The binding between the HTML-5 page and the Web SocketServer on the device needs to be handled properly.

Data following point 3 above is not necessarily "pushed" on Web Socket API connection 216, but may be made available from a specific time onwards through a well-defined "http://" label (or "http-label"). By using an http-label, HTML-5 processor 210 can access the data using XHR APIs, such as XHR connection 218. The data is considered as a sample that is accessible by the HTML-5 processor from decode time onwards at the identified label. This is similar to the FLUTE operation documented in 3GPP, with the exception that the availability of the sample is instantaneous, i.e., after the object is delivered. The file delivery table (FDT) provides information on the label as well as on other information such a content type and so on. Similar information may be provided. Ultimately, media renderer 220 may present audio and video data of audio track 182, video track 184, and web content track 186 in a time-synchronized manner, in accordance with the techniques of this disclosure.

In this manner, FIG. 6 represents an example of a device for retrieving media data that includes a memory configured to store media data, and one or more processors implemented in circuitry and configured to retrieve a file including the media data, web content formatted according to hypertext markup language (HTML), and data indicating how to synchronize the web content with the media data, and present the media data and the web content, wherein to present the media data and the web content, the one or more processors are configured to synchronize presentation of the web content with presentation of the media data according to the data indicating how to synchronize the web content with the media data.

FIG. 7 is a conceptual diagram illustrating an example processing model according to the techniques of this disclosure. In particular, FIG. 7 illustrates an example data processing model for media content 230, which may represent, for example, an ISOBMFF file, a CMAF presentation, or a DASH Media Presentation. In this example, media content 230 includes a plurality of tracks, including audio track 232, video track 234, and web content track 236. Collectively, audio track 232 and video track 234 may be referred to as audio/video (AV) tracks. Web content track 236 may correspond to a web/html-5 track including web content that is time-synchronized with audio and/or video data of audio track 232 and video track 234. Furthermore, web content track 236 may include data representing synchronization information with the AV tracks.

Client device 40 may be configured to process web track data of web content track 236 using this or a similar processing model. That is, client device 40 may be configured according to the model of client device 240 of FIG. 7. In this example, client device 240 includes audio track handler 242, video track handler 244, web content track handler 246, audio decoder 248, video decoder 250, interpreter 260, and media renderer 270.

The conceptual approach is discussed based on media timing, i.e., the data is stored in a file. However, such timing concepts may be put on a real-time timeline if data is streamed, for example, as is done in DASH. The focus of the example model of FIG. 7 is on track processing, assuming that all data is available to the track handler, e.g., web content track handler 246. Delivery specific aspects are discussed in more detail below.

In summary, with respect to FIG. 7, three types of sample data may be provided in one track, or in multiple tracks that may be generated and differentiated:

1) Initial launch data as well as "full" and "redundant" random access data. Such data may launch the HTML-5 processor or can be used at a later media time to randomly access the HTML-5 track. Random access may be redundant, in order to avoid reloading the DOM. However, to solve "error cases," pushing a launch data and forcing a page reload not using the Web Socket connection may be considered in the design.
2) Samples that are pushed at decode time into an established Web SocketClient that is part of the initially launched HTML-5 processing data. The samples may need to be identified to be pushed. Multiple Web Sockets may be generated. If multiple Web Sockets are provided, the binding may also be provided.
3) Samples that are made available as objects from decode time onwards at a well-defined "http://" label as this allows that the browser uses existing XmlHttpRequest APIs to gather the objects. Additional metadata may be provided to optimize the caching. Note that the samples may be included in the file or external data references may be used. In the latter case, the XHR request will not terminate in the "file" but will be forwarded into the network.

Generally, only "redundant" sync samples should be provided, in order to avoid complete DOM reload.

If the delivery is included, then the sample decode time may serve as a delivery indication as well as providing the information by what latest time (on the media timeline) the object needs to be received. The video and audio element no longer need only point to a single resource, but may use MSE and track buffers to append the media segments to the track buffer.

In the example of FIG. 7, web content track handler 246 may be an HTML-5 track handler in Javascript. Web content track handler 246 of FIG. 7 is one example implementation if, for example, the HTML-5 Track Handler is natively available. This may, for example, be interesting for Type 1 clients for which simple HTML-5 information is sent, possibly only a launch page and interactive data accessible through XHR without the push mechanism.

In this example, web content track handler 246 (e.g., an HTML-5 Track Handler) may be implemented in Javascript entirely and may make use of the data in the track to launch the service. In this case, the Javascript is executed to parse the ISO BMFF data and uses the track data to launch the presented page as well the dynamic metadata. The object and socket binding may be implemented in one client without using XHR or Web SocketAPIs. The same may be provided for the binding of the track to the media element. However, in both cases, the same track data may be used, just the implementation on the client may be different. In particular, in this example, web content track handler 246 provides track data 262 to interpreter 260, while audio decoder 248 and video decoder 250 provide data 264 associating audio and video elements with web content to interpreter 260.

In this example, all data may be regular HTML-5 data, such that no special media processing need be added beyond what is available in HTML-5. Also, the receiver may be a regular HTML-5 processor without any special modules.

Also relevant is the content generation. An HTML-5 session with audio/video may, for example, be "recorded"/ "generated" by just dumping the different pieces (launch page, request samples, and push samples) into a file format with a non-timed launch page, as well as the request samples timed when they get available (or are first referenced in the HTML-5 scene in media time) and the push samples may be assigned a decode time when they were pushed on the network.

In this manner, FIG. 7 represents an example of a device for retrieving media data that includes a memory configured to store media data, and one or more processors implemented in circuitry and configured to retrieve a file including the media data, web content formatted according to hypertext markup language (HTML), and data indicating how to synchronize the web content with the media data, and present the media data and the web content, wherein to present the media data and the web content, the one or more processors are configured to synchronize presentation of the web content with presentation of the media data according to the data indicating how to synchronize the web content with the media data.

Figure 8:
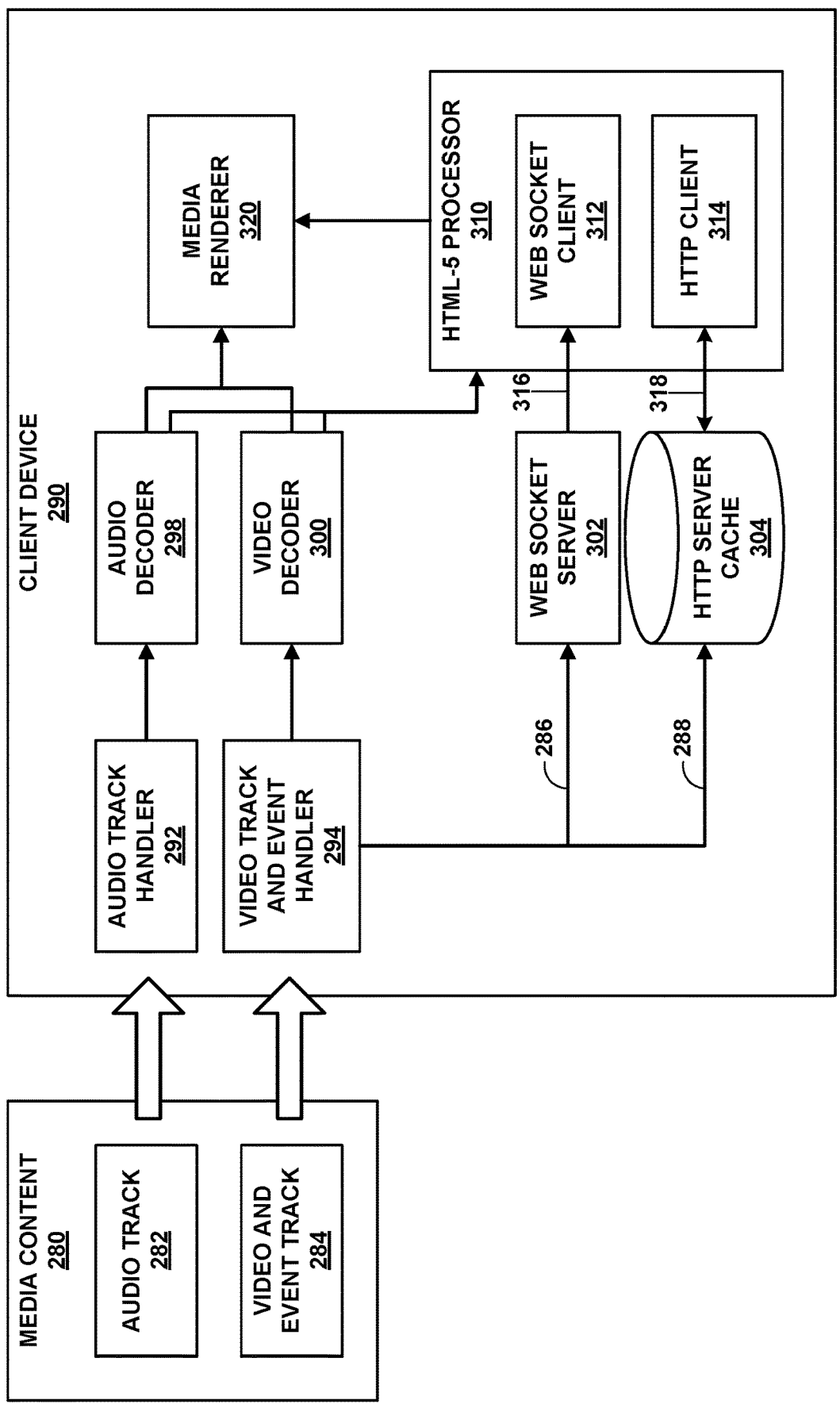
FIG. 8 is a conceptual diagram illustrating an example event-based model for techniques of this disclosure.

FIG. 8 is a conceptual diagram illustrating an example event-based model for techniques of this disclosure. The example model of FIG. 8 may be used as an alternative to the track model discussed above. In particular, FIG. 8 illustrates an example data processing model for media content 280, which may represent, for example, an ISOBMFF file, a CMAF presentation, or a DASH Media Presentation. In this example, media content 280 includes a plurality of tracks, including audio track 282 and video and event track 284. Video and event track 284 includes events, such as DASH Application events.

In the example of FIG. 8, client device 290 includes audio track handler 292, video track and event handler 294, audio decoder 298, video decoder 300, web socket server 302, HTTP server cache 304, HTML-5 processor 310, and media renderer 320. HTML-5 processor 310 includes web socket client 312 and HTTP client 314. Web socket server 302 and web socket client 312 are communicatively coupled via Web Socket API connection 316, while HTTP server cache 304 and HTTP client 314 are communicatively coupled via XML HTTP Request (XHR) connection 318.

Video track and event handler 294, in this example, may extract DASH Application events from video and event track 284 and pass the DASH events to the appropriate application. For example, video track and event handler 294 may extract Web Socket events 286 from video and event track 284 and pass Web Socket events 286 to web socket server 302. As another example, video track and event handler 294 may extract XHR events 288 and pass XHR events 288 to HTTP server cache 304. The application and web page may need to be downloaded with an original page that is outside of media content 280. One could also define dedicated WebSocket events or XHR events, but they may miss the details on binding and so on. Media content 280 (such as a ISO BMFF presentation or DASH/CMAF content) may be expanded further.

In yet another approach, a FLUTE concept may be used. The XHR samples may easily be solved with FLUTE, but timing is not necessarily aligned with media, which may limit the applicability. The data presentation is not necessarily complete. The Web Socket approach may use broadcast of web socket push data with labelling, which is not currently supported in conventional implementations.

Based on the discussion above, the techniques of this disclosure may use a strawman design of ISOBMFF tracks for web content carriage, as discussed below. That is, content preparation device 20, server device 60, and/or client device 40 of FIG. 1 may be configured to use the strawman design of ISOBMFF tracks for web content carriage of this disclosure, e.g., as discussed below. The strawman design is summarized as follows:

Use a text track, with handler type 'text', and MIME type 'text/htm5'.
Sample entry design
    The sample entry type is 'htm5'.
    An HTML5ConfigurationBox is defined, which is mandatory to be included into the sample entry and contains the following information:
        Basic HTML-5 and JavaScript (including JSON) information, such as the versions of the respective specifications, required and optional APIs, and so one.
        An array of JavaScript codes that may be referred to in the samples.
Sample design
    Sample definition: A sample is either
        1) an HTML-5 page plus some JavaScript codes as the launch page. This serves as a launch sample and may also be used a full sync sample (reloads the page). The HTML-5 page may also be provided as redundant sync sample.—This sample is referred to as "launch" sample
        2) some binary objects that are pushed to a specific websocket API at decode time (synchronized to media playout). It is the responsibility for the launch page to provide a proper binding between the binary object and the websocket API in the launch page. Such samples are no sync samples as they depend on the existing of the launch page. This objects are referred to as "push" samples.
        3) objects that can be accessed through HTTP requests (XHR would be the API) in order to react to interactivity or also load objects based on execution. The binding between launch page and the object is through an http URL. The sample may contain additional information on the management of the object, for example cache directives and so on. Examples are if the sample can be removed from the track handler buffer after being requested or is needs to maintained, etc. Such samples are referred to as "pull" samples.

The launch page may be provided as non-timed item in the track header or it may be provided as regular sample in the track, timed with decode time 0.

The decode time is interpreted depending on the sample type

For "launch" samples, the decode time is the time at which media time the page needs to be loaded into the HTML-5 engine.

For "push" samples, the decode time is the time at which the sample is pushed into the Web Socket-API.

For "pull" samples, the decode time is the earliest time at which the sample may be requested by the HTML-5 processor, i.e., the time at which the contained object is available.

Samples may be embedded in the track or external referencing may be done. In particular for the case of pull samples, external referencing may be done.

The JavaScript syntax is extended to be able to refer to a track in the file by using the track ID as well as an index to the array of JavaScript codes in the sample entry. For clients that rely on exiting standard JavaScript syntax, the file parser needs to translate the new referencing mechanism to what is compliant with the exiting standard JavaScript syntax.

Media type for htm5 in the track that permits to also add configuration information into the media type, for example on required APIs, etc.

Track binding between media tracks in the same presentation (ISO BMFF, DASH presentation, etc.) needs to be carried out. There are a few options:

Usage of the source element and provide a binding through a well defined new URI. For example a track://<tracknumber> may be defined to refer to a track. The resolution is up to the browser.

Alternatively an http binding may be done, similar to track contained resources. However, then there needs be indication for external binding.

Yet another alternative is to use of MSE such that the byte streams of the track can be sent to the browser. This option seems to be most suitable. This may for example be done by an implementation that uses the track URI to use MSE and JavaScript to load the media files in a synchronized manner.

A new track reference type, 'mdtk', is defined, for an HTML/XML (and here specifically, an HTML-5) track to refer to the media tracks that are tagged in at least one of HTML/WL documents contained in the samples of this track.

Multiple HTML-5 tracks are allowed. When multiple HTML-5 tracks do exist in a file, a differentiation between the tracks needs to be signaled. One example could be different display resolutions or devices. For this purpose, we can add a field of target display resolution into the HTML5ConfigurationBox. Alternatively, a single launch may always be used, but then multiple tracks may be in the file that are dependent and only specific tracks are accessed.

Demonstration of the framework based on the data processing model is facilitated by the fact that its significant part relies on existing technologies with existing stable implementations. On the receiving side of things, only the HTML track handler needs to be implemented. Similarly, on the content generation side, HTML track packager may be implemented. Once these modules are implemented, a real-time interactive prototype is realized for demonstration using an existing browser, e.g., Chrome browser, Open Source socket- and HTTP-Servers.

As an example demonstration scenario, a user may launch the browser to access an interactive stream of a scientific documentary on the Internet using the HTTPS URL of the stream, e.g., example.com/InteractiveStream.mp4 (preceded by "https://"). Upon accessing this URL, a fully featured web-page may appear with two video stream thumbnails presenting two options: play the feature or play behind the scenes track. Upon clicking one of the two options, the movie plays in the full browser window with thumbnail images of the presenters for the next 30 seconds. Clicking one of the thumbnails may open the presenter profile in a new window.

All the data for presenting the demo may be embedded in the interactive file except the presenter profile, which may be accessed from the open Internet. If a service worker is needed (since there is no support for HTML track decoding via MSE for the expected timeframe; the client may need to demultimplex the stream also because of lack of current support for HTML track natively), its realization may need to be seen. It can either be pre-loaded, facilitated by accessing a glue URL, or by server-side scripting. A simplification could be done if the HTML track is offered separately from audio/video, but this may reduce the impact of the demo.

An interactive HTML page may be created using existing Creative Commons video content and/or HTML page authoring tools. Since there is no existing encoder for the HTML content, if there is a very small number of samples, a script may be written, e.g., in Python, to chunk and package the HTML content. It is assumed that existing packagers e.g., MP4Box, may be able to form multiple HTML track, even if the samples are of unknown type for the packager. JavaScript may be used to decode the HTML track. The client device may also demultiplex the HTML track using a script.

Setup for a client-side application may include setting up a client machine, accessing an open-source web-socket server (if needed), and accessing an HTML server. The client-side application may include a service worker in JavaScript, which may only include the HTML track decoder discussed above.

The strawman design may be expanded beyond the examples discussed above. For example, the strawman design may be expanded to account for HTML-5 that requires HTTPS connections to the outside. The strawman design may address CORS issues. MPEG-4, MAFs, or other standards may be expanded to account for the strawman design of this disclosure. Furthermore, additional details may be added for mapping delivery and segmented content.

In this manner, FIG. 8 represents an example of a device for retrieving media data that includes a memory configured to store media data, and one or more processors implemented in circuitry and configured to retrieve a file including the media data, web content formatted according to hypertext markup language (HTML), and data indicating how to synchronize the web content with the media data, and present the media data and the web content, wherein to present the media data and the web content, the one or more processors are configured to synchronize presentation of the web content with presentation of the media data according to the data indicating how to synchronize the web content with the media data.

Figure 9:
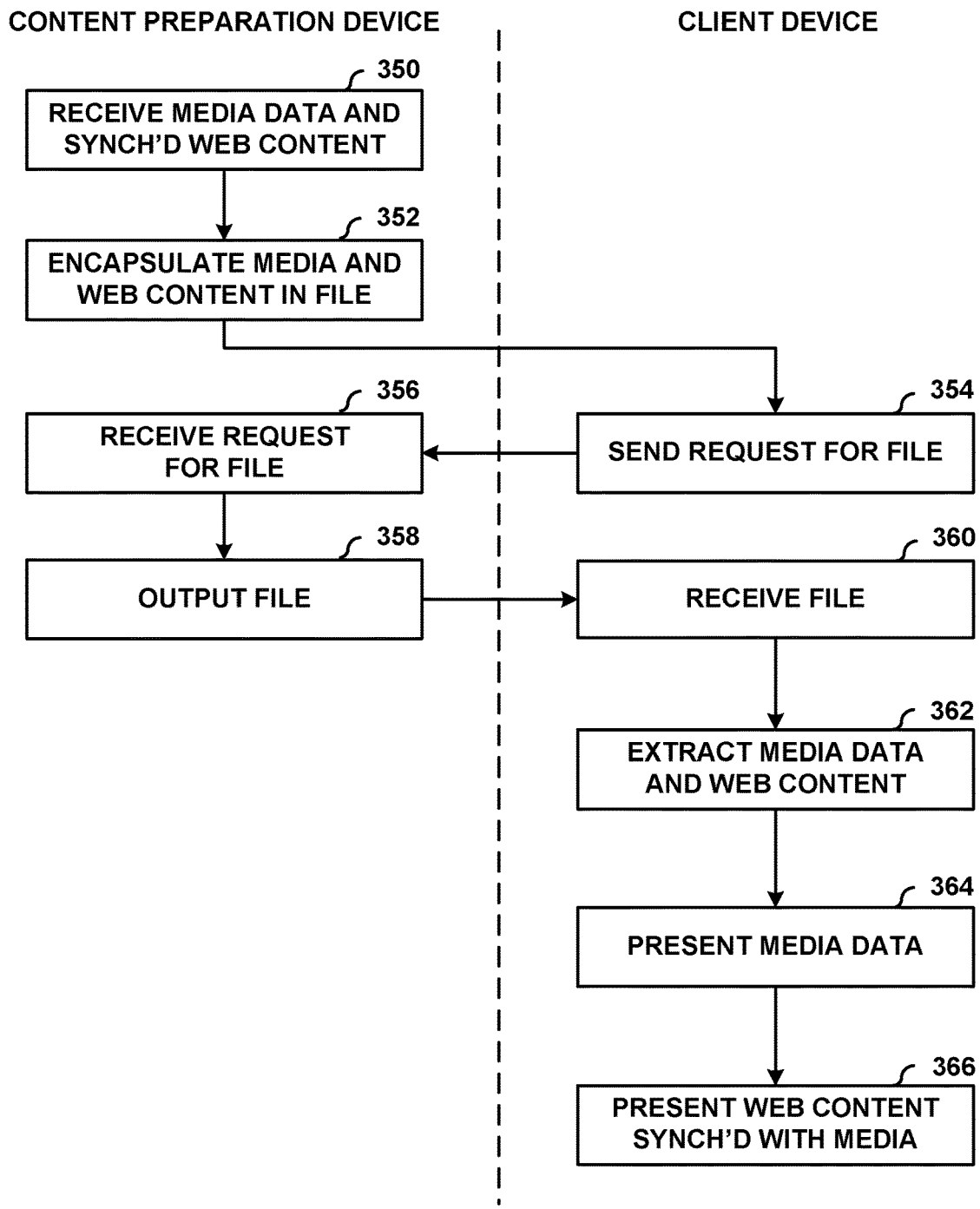
FIG. 9 is a flowchart illustrating an example method for retrieving and processing media data and synchronized web content in accordance with the techniques of this disclosure.

FIG. 9 is a flowchart illustrating an example method for retrieving and processing media data and synchronized web content in accordance with the techniques of this disclosure. The method of FIG. 9 is explained with respect to content preparation device 20 and client device 40 of FIG. 1. However, it should be understood that other devices may be configured to perform the techniques of FIG. 9. For example, client devices configured according to the client device models of any of FIGS. 6-8 may perform the elements of FIG. 9 attributed to client device 40. As another example, server device 60 may perform certain elements attributed to content preparation device 20, such as sending and receiving data via a network.

Initially, content preparation device 20 receives media data and time-synchronized web content (350). For example, encapsulation unit 30 may receive audio data from audio encoder 26, video data from video encoder 28, timed text, or other media data, as well as web content that is to be presented in a time-synchronized fashion with the media data. Encapsulation unit 30 of content preparation device 20 may then encapsulate the media data and the web content in a file (352). For example, encapsulation unit 30 may encapsulate audio data in an audio track, video data in a video track, and web content in a web content track, as shown in FIGS. 6 and 7. Alternatively, encapsulation unit 30 may encapsulate both video data and event data defining web content events in a video and even track, as shown in FIG. 8.

Subsequently, client device 40 may send a request for the file (354). Although not shown in FIG. 9, in some examples, content preparation device 20 may provide a manifest file (such as a DASH MPD) indicating a web address (e.g., URL) of the file, and client device 40 may first retrieve the manifest file to determine the web address of the file. In any case, client device 40 may send a request for the file (354), e.g., an HTTP GET or partial GET request defining a URL of the file. Content preparation device 20 (or server device 60) may receive the request for the file (356) and output the requested file (358) to client device 40.

Client device 40 may then receive the file (360). After receiving the file, client device 40 may extract the media data and the web content (362), present the media data (364) and present the web content time-synchronized with the media data (366). For example, as shown in FIGS. 6 and 8, client device 40 may include a web socket server, an HTTP server cache, and an HTML-5 processor. In this example, to present the media data and the web content in a time-synchronized manner, client device 40 may initially launch a web page and delay presentation of the media data accordingly. Then, the web socket server may push web content via a Web Socket API at a decode time of corresponding media data and/or the HTML-5 processor may request media data within a particular media time period via XHR from the HTTP server cache. In some examples, e.g., as shown in FIG. 8, the web socket server or another unit (such as a video track and event handler) may retrieve certain elements of web content from a separate server.

As another example, as shown in FIG. 7, client device 40 may include a web content track handler and an interpreter. In this example, to present the media data and the web content in a time-synchronized manner, client device 40 may initially launch a full web page as well as full and/or redundant random access data. Then, the interpreter and the web content track handler may use JavaScript, a Web Socket API, XHR, or the like to communicate pushed and/or pulled web content.

In this manner, the method of FIG. 9 represents an example of a method including retrieving a file including media data, web content formatted according to hypertext markup language (HTML), and data indicating how to synchronize the web content with the media data, and presenting the media data and the web content, wherein presenting the media data and the web content comprises synchronizing presentation of the web content with presentation of the media data according to the data indicating how to synchronize the web content with the media data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   retrieving a file including media data, web content formatted according to hypertext markup language (HTML), and data indicating how to synchronize the web content with the media data, wherein the web content defines a launch page provided as a non-timed item in a header for a web content track of the file; and
   presenting the media data and the web content, wherein presenting the media data and the web content comprises synchronizing presentation of the web content with presentation of the media data according to the data indicating how to synchronize the web content with the media data.

2. The method of claim 1, wherein the web content is included in a web content track of the file.

3. The method of claim 1, wherein the file is formatted according to ISO Base Media File Format (ISOBMFF).

4. The method of claim 1, wherein the file includes a text track having a handler type of 'text' and a MIME type of 'text/htm5.'

5. The method of claim 1, wherein the file includes a sample entry having a sample entry type of 'htm5,' and wherein the sample entry includes an HTML5ConfigurationBox including HTML information, JavaScript information, and an array of JavaScript codes.

6. The method of claim 1, wherein the file includes one or more samples, each of the samples comprising one of an HTML page including JavaScript codes, binary objects, or objects accessible through HTTP requests.

7. The method of claim 1, wherein the header for the web content track of the file comprises a track header for the web content track of the file.

8. The method of claim 1, wherein the web content defines a launch page provided as a sample in a web content track of the file.

9. The method of claim 1, wherein a sample of the web content is associated with a decode time, the method further comprising:
   when the sample comprises a launch sample, loading a web page of the sample no later than the decode time;
   when the sample comprises a push sample, pushing the sample into a Web SocketAPI at the decode time; and
   when the sample comprises a pull sample, requesting the sample no earlier than the decode time.

10. The method of claim 1, further comprising retrieving a sample from a web content track of the file or using external referencing.

11. The method of claim 1, further comprising executing JavaScript of the web content that references a track in the file.

12. The method of claim 1, wherein the web content is included in an htm5 track of the file, and wherein a media type for the htm5 track indicates that configuration information is added for the media type.

13. The method of claim 1, further comprising determining a binding between media tracks in a presentation corresponding to the file.

14. The method of claim 1, further comprising processing a track of the file having a track reference type of 'mdtk.'

15. The method of claim 1, wherein the file includes a plurality of HTML-5 tracks.

16. The method of claim 13, wherein the binding comprises a well-defined uniform resource identifier (URI).

17. The method of claim 13, wherein the binding comprises an HTTP binding.

18. The method of claim 13, wherein the binding comprises a media source extension (MSE) binding.

19. The method of claim 18, further comprising sending byte streams of a track of the file, the track including the web content, to a web browser.

20. A device for retrieving media data, the device comprising:
   a memory configured to store media data; and
   one or more processors implemented in circuitry and configured to:
      retrieve a file including the media data, web content formatted according to hypertext markup language (HTML), and data indicating how to synchronize the web content with the media data, wherein the web content defines a launch page provided as a non-timed item in a header for a web content track of the file; and
      present the media data and the web content, wherein to present the media data and the web content, the one or more processors are configured to synchronize presentation of the web content with presentation of the media data according to the data indicating how to synchronize the web content with the media data.

21. The device of claim 20, wherein the web content is included in a web content track of the file.

22. The device of claim 20, wherein the file is formatted according to ISO Base Media File Format (ISOBMFF).

23. The device of claim 20, wherein the file includes a text track having a handler type of 'text' and a MIME type of 'text/htm5.'

24. The device of claim 20, wherein the file includes a sample entry having a sample entry type of 'htm5,' and wherein the sample entry includes an HTML5ConfigurationBox including HTML information, JavaScript information, and an array of JavaScript codes.

25. The device of claim 20, wherein the file includes one or more samples, each of the samples comprising one of an HTML page including JavaScript codes, binary objects, or objects accessible through HTTP requests.

26. The device of claim 20, wherein the header for the web content track of the file comprises a track header for the web content track of the file.

27. The device of claim 20, wherein the web content defines a launch page provided as a sample in a web content track of the file.

28. The device of claim 20, wherein a sample of the web content is associated with a decode time, and wherein the one or more processors are further configured to:
when the sample comprises a launch sample, load a web page of the sample no later than the decode time;
when the sample comprises a push sample, push the sample into a Web SocketAPI at the decode time; and
when the sample comprises a pull sample, request the sample no earlier than the decode time.

29. The device of claim 20, wherein the one or more processors are configured to retrieve a sample from a web content track of the file or using external referencing.

30. The device of claim 20, wherein to present the web content, the one or more processors are configured to execute JavaScript of the web content that references a track in the file.

31. The device of claim 20, wherein the web content is included in an htm5 track of the file, and wherein a media type for the htm5 track indicates that configuration information is added for the media type.

32. The device of claim 20, wherein the one or more processors are further configured to determine a binding between media tracks in a presentation corresponding to the file.

33. The device of claim 20, wherein the file includes a plurality of HTML-5 tracks.

34. The device of claim 20, wherein the device comprises at least one of:
an integrated circuit;
a microprocessor; and
a wireless communication device.

35. The device of claim 32, wherein the binding comprises one of a well-defined uniform resource identifier (URI), an HTTP binding, or a media source extension (MSE) binding.

36. A device for retrieving media data, the device comprising:
means for retrieving a file including media data, web content formatted according to hypertext markup language (HTML), and data indicating how to synchronize the web content with the media data, wherein the web content defines a launch page provided as a non-timed item in a header for a web content track of the file; and
means for presenting the media data and the web content, wherein the means for presenting the media data and the web content comprises means for synchronizing presentation of the web content with presentation of the media data according to the data indicating how to synchronize the web content with the media data.

37. A non-transitory computer-readable storage medium having stored thereon instructions that, when executed, cause a processor to:
retrieve a file including media data, web content formatted according to hypertext markup language (HTML), and data indicating how to synchronize the web content with the media data, wherein the web content defines a launch page provided as a non-timed item in a header for a web content track of the file; and
present the media data and the web content, wherein the instructions that cause the processor to present the media data and the web content comprise instructions that cause the processor to synchronize presentation of the web content with presentation of the media data according to the data indicating how to synchronize the web content with the media data.

38. The non-transitory computer-readable storage medium of claim 37, wherein the web content is included in a web content track of the file.

39. The non-transitory computer-readable storage medium of claim 37, wherein a sample of the web content is associated with a decode time, further comprising instructions that cause the processor to:
when the sample comprises a launch sample, load a web page of the sample no later than the decode time;
when the sample comprises a push sample, push the sample into a Web SocketAPI at the decode time; and
when the sample comprises a pull sample, request the sample no earlier than the decode time.

40. The non-transitory computer-readable storage medium of claim 37, further comprising instructions that cause the processor to retrieve a sample from a web content track of the file or using external referencing.

41. The non-transitory computer-readable storage medium of claim 37, further comprising retrieving a sample from a web content track of the file or using external referencing.

42. The non-transitory computer-readable storage medium of claim 37, further comprising instructions that cause the processor to execute JavaScript of the web content that references a track in the file.

43. The non-transitory computer-readable storage medium of claim 37, wherein the web content is included in an htm5 track of the file, and wherein a media type for the htm5 track indicates that configuration information is added for the media type.

44. The non-transitory computer-readable storage medium of claim 37, further comprising instructions that cause the processor to determine a binding between media tracks in a presentation corresponding to the file.

45. The non-transitory computer-readable storage medium of claim 37, further comprising instructions that cause the processor to process a track of the file having a track reference type of 'mdtk.'

46. The non-transitory computer-readable storage medium of claim 37, wherein the file includes a plurality of HTML-5 tracks.

47. The non-transitory computer-readable storage medium of claim 44, wherein the binding comprises a well-defined uniform resource identifier (URI).

48. The non-transitory computer-readable storage medium of claim 44, wherein the binding comprises an HTTP binding.

49. The non-transitory computer-readable storage medium of claim 44, wherein the binding comprises a media source extension (MSE) binding.

50. The non-transitory computer-readable storage medium of claim 49, further comprising instructions that cause the processor to send byte streams of a track of the file, the track including the web content, to a web browser.

* * * * *